Sept. 22, 1942. W. H. GREEN 2,296,437
WATER TREATMENT AND APPARATUS
Filed Nov. 25, 1938
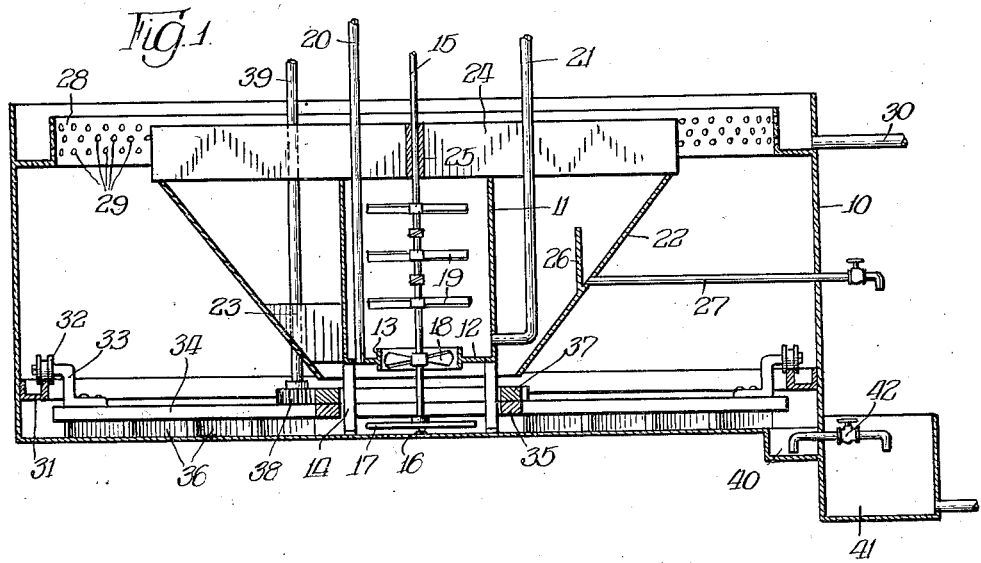
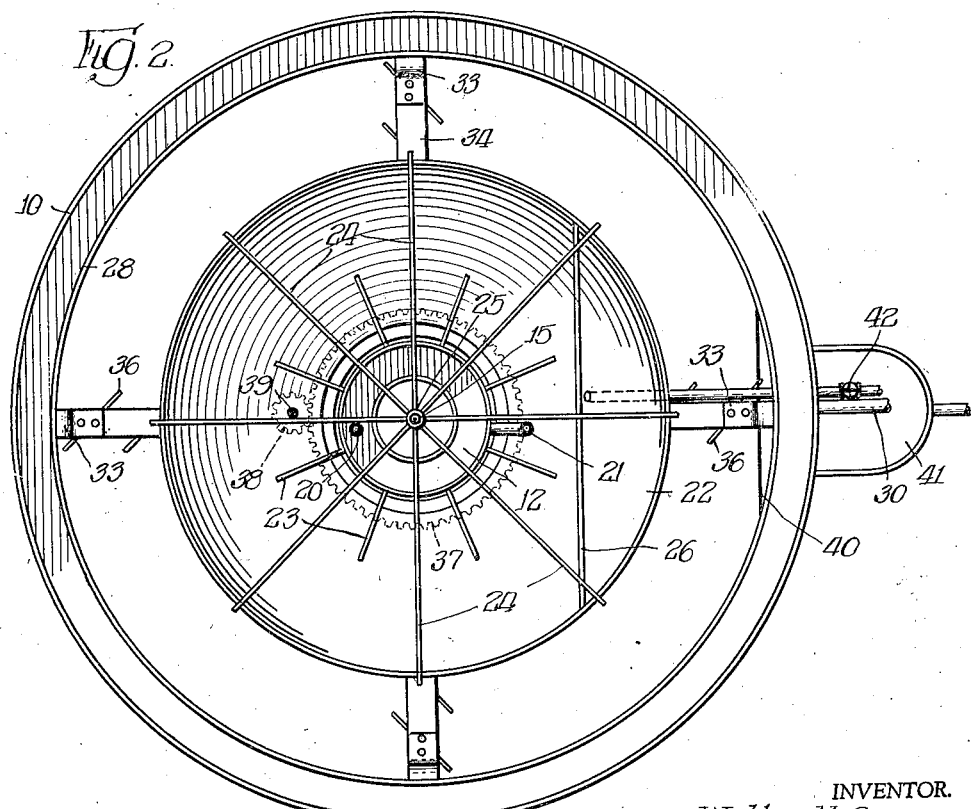
INVENTOR.
Walter H. Green,
BY Cromwell, Greist + Warden
ATTORNEYS.

Patented Sept. 22, 1942

2,296,437

UNITED STATES PATENT OFFICE 2,296,437

WATER TREATMENT AND APPARATUS

Walter H. Green, Chicago, Ill., assignor to Infilco, Inc., Chicago, Ill., a corporation of Delaware Application November 25, 1938, Serial No. 242,161

15 Claims. (Cl. 210—16)

The present invention relates to an improved process and apparatus for removing substances from liquids in solid form, examples of the application of the invention being the softening and clarification of water and treatment of sewage and industrial waters.

A principal object of the invention is the continuous formation, conditioning and removal of solids from a liquid wherein there is established a local mixing and reaction zone into which liquid to be treated is introduced and a communicating clarification zone in which solids to be separated are removed from the liquid while the latter is in a principal horizontal travel, the separated solids being returned at least in part to the mixing and reaction zone while the liquid in said zone is maintained in a state of relatively vigorous agitation.

A further object of the invention is the treatment of a liquid in the manner described and including sedimentation of solids from horizontal flow of the liquid in the clarification zone and return of the solids after sedimentation to the reaction zone.

Still another object of the invention is the treatment of a liquid with a precipitate-forming reagent in a local reaction zone in which there is established a vigorous agitation and circulation of liquid undergoing treatment and liquid containing previously separated solids concentrated into a slurry, a portion of the liquid from the mixing and reaction zone being passed outwardly through a horizontal clarification zone to form a deposit of sediment which thereafter is returned to the reaction zone, and another portion of liquid from the reaction zone being returned with suspended particles to the reaction zone.

A further object of the invention is the improved clarification of water in a combined process for softening the water or removing suspended solids from it wherein there is provided in a body of water a slurry of previously separated and concentrated solid particles, the liquid being mixed with the slurry in the presence of a precipitate-forming material, and the slurry being relatively vigorously mechanically agitated to produce a local mixing zone through, from and to which is circulated the slurry and water being treated, the improvement including withdrawing a portion of the slurry after it has circulated through the mixing zone and before it is returned to the mixing zone and passing the slurry outwardly or in a horizontal manner to provide for sedimentation of particles which then are returned in solid form to the local mixing zone preferably along with unsedimented slurry.

A further object of the invention is to provide a process and apparatus of the kind referred to wherein solids separated from treated liquid in a clarification zone are carried back into the reaction zone by a continuous circulation through both zones of liquid undergoing treatment and wherein there is effected an increase or concentration of solids in or into the return flow to the end that the quantity of solids introduced into the reaction zone may be maintained with a lesser circulation of liquid.

Another object is to provide apparatus suitable to a treatment of the kind herein described, wherein there is maintained a continuous circulation of liquid undergoing treatment and carrying suspended solids between and through a reaction chamber and a separation space and wherein separation of solids from treated liquid is had during horizontal flow of the liquid.

Another object is to provide in this type of apparatus means for concentrating within the return flow solids separated from the liquid in the horizontal flow, there also being provided means for introducing a treating reagent into the returning flow of liquid prior to admixture of the incoming water therewith.

A further object is the provision of apparatus adapted to a treatment of the kind referred to that includes a mechanical member for imparting motion to the liquid to create and maintain the desired circulation of solids carrying liquid, and other mechanical means for moving settled solids to within the influence of said circulation.

These and other objects will be observed and understood from a consideration of the following description of a preferred embodiment of the invention and by reference to the accompanying drawing, in which Fig. 1 is a vertical partially sectional view showing apparatus constructed in accordance with the invention; and Fig. 2 is a top view of the apparatus shown in Fig. 1.

A type of water treatment for clarification and softening purposes which has met with great favor within recent years includes establishment of a concentrated slurry of previously precipitated particles such as hardness-imparting constituents, circulation of this slurry through, from and to a local mixing zone by the use of a stream-projecting impeller, mixing softening chemicals, coagulants or other precipitate-forming reagents with the slurry and introducing

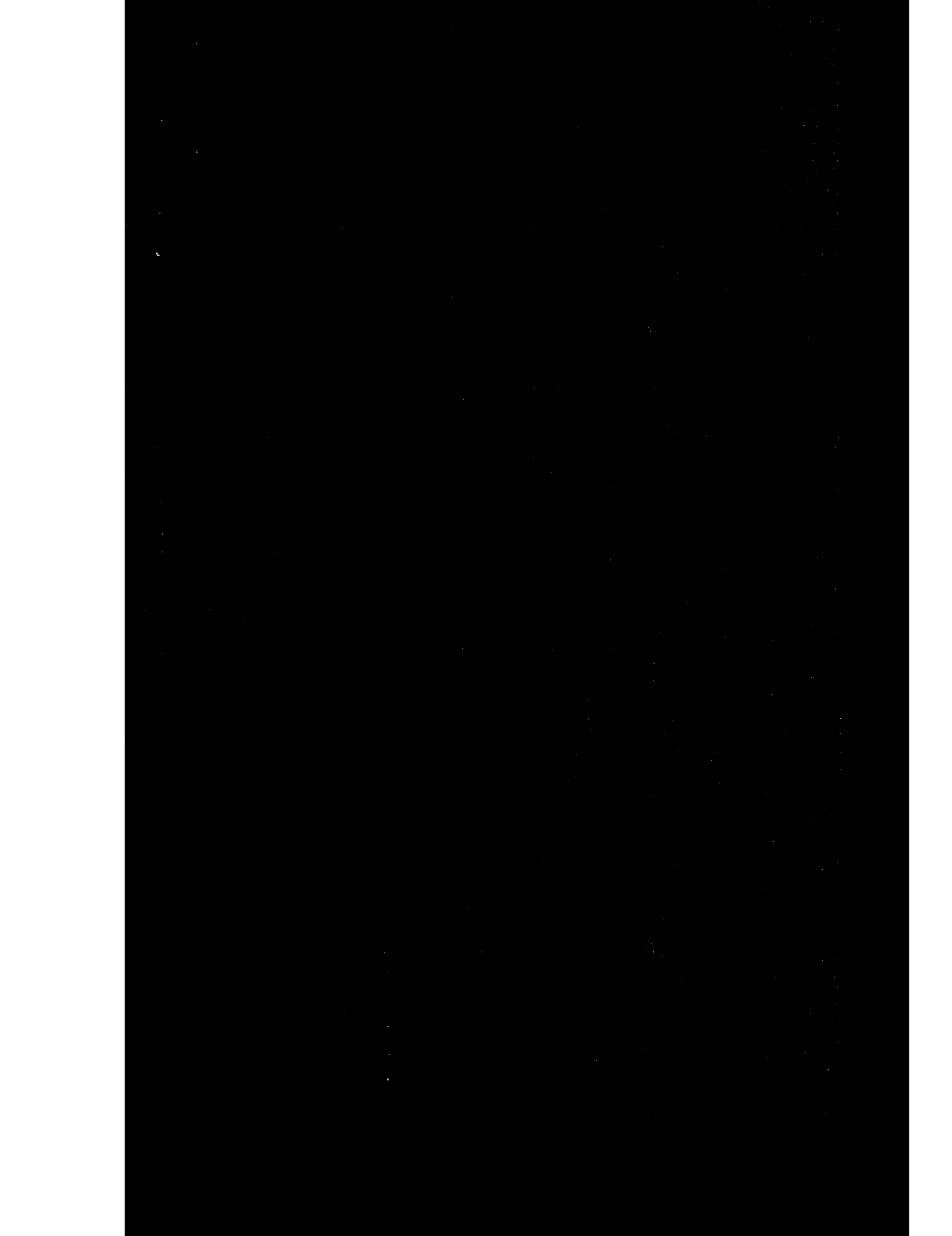

it the chemicals from conduit 20 and the raw water from conduit 21, thereby effecting a softening reaction which includes the precipitation of hardness-imparting constituents in solid crystalline form. The liquid in the local mixing zone of cylinder 11 passes upwardly therein and flows over the top of the cylinder through the baffles 24. The impeller 18 may be of such size and the shaft 15 may be rotated at such speed as to effect recirculation of a major portion of the water spilling over the top of cylinder 11. That is, there may be returned to the cyilnder 11 by way of the frusto-conical member 22 a greater quantity of previously treated water than is introduced into the cylinder 11 by the raw water conduit 21. An amount of water equal or equivalent to the raw water inlet flows over the top of the frusto-conical member 22 and passes in a substantially horizontal manner outwardly toward the perforated launder 48, the baffles 24 having cut down the rotation of this water to such an extent that the outward flow to the perforated launder is relatively quiescent.

The softening reaction between the chemicals and the raw water effects the formation of a precipitate and this precipitate remains in the water flowing out of the top of the cylinder 11. The water which is returned to the cylinder 11 by the action of the impeller 18 then contains these previously formed particles of precipitate which are admixed with the chemicals from line 22 before contact of the latter with the raw water entering through line 21. As this process is continued, it will be seen that the softening reaction is carried out in the presence of suspended particles of previously formed precipitate.

Conducting the process or chemical reaction in this manner causes a building up of particles into aggregates or crystalline clusters of considerably larger size than the particles which normally would result by treatment of the hard water wtih softening reactants.

The upper diameter of the conical member 22 is sufficiently large that a major portion of the solids in the liquid overflowing the cylinder 11 tends to settle down into the conical member toward the lower end of the cylinder. This effects a further concentration of solids in the water emerging from the bottom of the conical member 22. This water with its suspension of solids is returned to the mixing and reaction cylinder by the action of the impeller, so that there is built up a solid concentration in the water recirculated through the cylinder 11. These solids are composed of previously formed particles built up into a slurry which may contain any desired percentage of solids, such as 3 per cent or more. It is highly advantageous to effect the chemical reaction in the presence of this slurry in the described circulating system. This result is secured particularly well when the softening chemicals are added to the slurry prior to the admixture of the slurry with the raw water.

In the case of large installations the amount of raw water input is so great as to require recirculation of a relatively large volume of slurry in order to provide the desired ratio between the previously precipitated particles and the raw water. The relatively large volume involved creates definite problems of agitation and mixing in order to obtain the desired softening reaction and build-up of particle size. For this reason, it is desirable to provide in the recirculated slurry a relatively high solids content, thereby reducing the volume of slurry to be recirculated. For example, it is not necessary to recirculate as large a quantity of slurry containing 4 per cent solids as in the case of a slurry containing 2 per cent solids.

A quantity of water equivalent to the raw water input flows over the top of the conical member 22 and flows outwardly toward the perforated launder 28, the baffles 24 acting to retard the rotary motion of the water as it emerges from the cylinder 11 to provide a state of relative quiescence in the upper portion of the tank. After the water has passed over the conical member 22 the solids contained in the water are free to settle or sediment downwardly through the tank 10 to the bottom thereof.

The particular amount of solids contained in the water after passing over the conical member 22 will depend upon such factors as the operating conditions of the process and the diameter of the conical member. It would be desirable that the water passing outwardly in this manner contain a quantity of solids equivalent to the quantity of solids represented by the hardness content of the raw water input. This would provide for a balance of solids content in the cylinder 11 after the process has progressed sufficiently to build up the slurry to the desired solids concentration. However, any variation in the operating conditions of the process naturally would tend to change such an arrangement, so that as a matter of fact the water passing over the conical member 22 generally will contain more solids than it is desired to remove from the process. These solids settle downwardly before the water reaches the launder 28, so that the water passing through the openings 29 is clear.

As the solids sediment they settle to the bottom of the tank 10. The scrapers 36 transfer these sedimented particles toward the center of the tank. As the particles reach the central portion of the tank they are put into suspension by the rotating arm 17 and are picked up in the current of water passing upwardly through the propeller 18 and the cylindrical tank 11. Thus, the slurry introduced into the bottom of the cylinder 11 is composed of water recirculated through the conical member 22 with a content of solids which have not been sedimented and a content of solids which have sedimented in the outer portion of the tank and then returned as described. This produces a heavy slurry of suspended particles which cuts down the volume of liquid necessary for admixture with the raw water and chemicals, thereby making more effective the action of the stream-projecting impeller 18 and the agitating or mixing arms 19.

The use of a perforated launder is desirable, since the flow of liquid to the apparatus is sufficient to build a head above the lower openings of the launder.

Passage of the outlet water through the plurality of holes in the perforated launder cuts down the skimming or surface flow tendency of the liquid flowing over the top of the conical member. That is, where a weir is used for escape of liquid from the center of the tank there is a pronounced tendency for the water adjacent the surface of the liquid in the tank to pass at a relatively high rate of flow to the outlet weir. This skimming action cuts down the time within which solids can settle from the surface liquid and is objectionable. To cut down this skimming tendency still further it is possible to employ any suitable type of baffle construction between the center of the tank and the outlet. A perforated or slotted open-ended cylindrical member (not shown) submerged from adjacent the surface of liquid in the tank is of benefit in this regard.

The portion of the liquid which is recirculated through the central mixing zone is distributed divergently from the top of the mixing zone into the clarification zone and is returned from the clarification zone convergently to the lower portion of the mixing zone, this liquid carrying its suspended content of previously precipitated particles. This circulation, together with return of sedimented solids by the rakes 36 result in return of a relatively heavy slurry of suspended particles through the mixing zone and provides for the desired contact between previously precipitated particles and substances coming out of solution in the mixing zone without the necessity of circulating an excessively large volume of liquid. In many cases it will be found possible to operate in the manner described with the return of a minor volume of previously treated water containing the suspended particles as compared with the volume of incoming water. The particular amount of slurry recirculated will depend upon such factors as the concentration of particles in the slurry and the amount of material coming out of solution in the mixing zone. The concentration of solids in the slurry may be well above 3 per cent. Concentration of the particles of previously precipitated solids in the water as described thus permits the treatment of a maximum amount of incoming water with a minimum amount of recirculated liquid. This is an important factor in large installations where the amount of incoming water is relatively great.

It will be recognized that many changes may be made in the procedure and apparatus described herein for purposes of explanation, and such changes are intended to be included in the appended claims.

I claim:

1. In water treating apparatus of the type described, the combination of a tank, a launder for treated water adjacent the top of said tank, a mixing chamber in said tank, said mixing chamber having an inlet opening positioned to receive water from the lower portion of said tank and an outlet so positioned relative to said launder that flow from the one to the other will have a horizontal component greater than the vertical component, a conduit for delivering water to be treated to said mixing chamber, a conduit for supplying treating reagent to said water, a power driven water moving member of such capacity and so positioned that on operation thereof it will cause flow into said mixing chamber of a volume of water at least as great as the volume of water entering to be treated, a scraper member in said tank adapted to move sedimented solids separated from treated water to adjacent the inlet opening of said mixing chamber, and an outlet for discharging solids to waste.

2. A water treating process that comprises maintaining an upward and downward circulation of water undergoing treatment, passing the water while moving in one of said directions of flow through a mixing and reaction zone, passing raw water and a reagent into said zone, delivering a portion of the water from the upward flow into a horizontal sedimentation flow, withdrawing clarified water from the outer limit of the horizontal flow, entraining a portion of the solids settling from the horizontal flow in the downward flow and carrying them into the upward flow and scraping another portion of the solids settling from the horizontal flow to a point of delivery.

3. A water treating process that comprises maintaining an upward and downward circulation of water undergoing treatment, passing the water while moving in one of said directions through a mixing zone, passing raw water and a precipitating reagent into said mixing zone, delivering a portion of the water from the upward flow into a horizontal sedimentation flow, withdrawing clarified water from the outer limit of said sedimentation flow, entraining solids separated from the clarified water in the downward flow, deflecting a portion of said solids inwardly toward the upward flow, separating another portion of said solids from said downward flow, and discharging the last named solids to waste.

4. A water treating process that comprises maintaining an upward and downward circulation in a part only of a body of water undergoing treatment, passing the water while in one of said directions of flow through a turbulent mixing zone, adding raw water and a reagent into said mixing zone, delivering a portion of the water from the top of the upward flow into a horizontally extending clarification zone, withdrawing treated water from the periphery of the clarification zone, entraining a portion of the solids settling from water in the clarification zone in the downward circulation, separating a part of the solids from the water within the circulation for discharge to waste, and scraping another portion of the solids settling from water in the clarification zone to a point of delivery.

5. The process of removing a hardness-imparting calcium compound from water, which comprises establishing in a body of water a zone of slurry composed of water containing suspended particles precipitated and collected from a relatively large volume of previously treated water, circulating said slurry in a flow which has an upward movement through a mixing zone and a downward return movement, passing incoming water and a calcium precipitating compound into the flow through said mixing zone, passing a portion of said upward flow horizontally through a sedimentation zone, withdrawing an output quantity of clarified water from said horizontal flow, entraining a portion of the solids sedimenting from the sedimentation flow in the downward return flow, permitting another portion of the solids sedimenting from the sedimentation flow to come to a state of rest below said sedimentation zone, and removing sedimented solids from below said sedimentation zone.

6. The process of removing hardness-imparting constituents from water by a precipitation process, which comprises circulating a slurry composed of water containing suspended particles precipitated and collected from a relatively large volume of previously treated water upwardly through a turbulent mixing zone and in a downward return flow, passing incoming hard water and a precipitating compound into the flow through said mixing zone, passing a portion of the flow from said mixing zone through a horizontal sedimentation zone, withdrawing an output quantity of clarified water from said horizontal flow, and moving sedimented solids from said sedimentation zone back to said mixing zone.

7. Apparatus of the type described, comprising a basin, a vertically extending centrally located mixing chamber in said basin, said chamber having a lower inlet and an upper outlet communicating with said basin, a liquid impeller placed to cause a flow of water containing suspended solids upwardly through said mixing chamber from said inlet to said outlet, conduit means for delivering water to be treated to within said basin and for adding a precipitate forming substance to said water, an outlet for treated water separated from the outlet of said mixing chamber by a clarifying zone extending horizontally in the top of the basin, a chamber in said basin located to receive precipitate from the water in the basin, a discharge to waste from said last named chamber, and means for returning sedimented solids from the clarifying zone to the mixing chamber.

8. Apparatus of the type described, comprising a clarification chamber, a vertically extending mixing chamber laterally adjacent to said clarification chamber, an inlet into the lower portion of said mixing chamber communicating with the lower portion of said clarification chamber, an outlet from the upper part of said mixing chamber communicating with the upper portion of said clarification chamber, a stream-projecting impeller so constructed and arranged as to cause a flow of liquid through said mixing chamber from said inlet to said outlet, means for introducing liquid to be treated into said mixing chamber, means for introducing treating reagent to said liquid, an outlet for treated water from the upper part of said clarification chamber and spaced a substantial distance horizontally from the outlet of said mixing chamber, a scraper within and adjacent the bottom of said clarification chamber adapted to move sedimented solids to the inlet into said mixing chamber, and means for removing sedimented solids.

9. Apparatus of the type described, comprising a basin having therein a sedimentation zone in the upper part thereof, a vertically extending mixing chamber having an inlet adjacent the floor of the basin and an outlet in the upper part thereof, a rotatable water impeller placed to cause on rotation thereof a flow of water upwardly through said mixing chamber from its inlet to its outlet, conduit means for delivering water to be treated to the mixing chamber, conduit means for introducing treating reagent to said water, a launder receiving clarified water from the upper part of said basin, the outlet of said mixing chamber and said launder being so placed in the apparatus that flow from the former to the latter is through the sedimentation zone and will be in a substantially horizontal plane across the top of said basin, means for removing solids from the apparatus, and means for returning particles from said sedimentation zone to the flow of water into said mixing chamber.

10. Apparatus of the type described, comprising a tank, a central mixing chamber in said tank, said chamber having an inlet from the lower part of said tank and an outlet into the upper part thereof, a stream-projecting impeller operable to cause flow through said mixing chamber, separate conduit means for introducing water to be treated and a reactant into the flow through said mixing chamber, an inverted frusto-conical circulation member in said tank surrounding said mixing chamber, a launder for clarified water adjacent the periphery of said tank, an outlet conduit from said launder, radial baffles extending from adjacent the outlet of said mixing chamber across the upper part of said tank toward each launder, and a waste outlet from said tank.

11. Apparatus of the type described, comprising a tank having a peripheral launder for withdrawing treated liquid, an outlet from said launder, a central vertical mixing chamber in said tank, said mixing chamber having an inlet from the lower portion of said tank and an outlet into its upper portion, a stream-projecting impeller within said mixing chamber and so placed as to cause a flow of water upwardly through said mixing chamber, a circulation sleeve surrounding said mixing chamber, a waste outlet from the apparatus, and means outside said sleeve for moving sedimented solids in said tank to the inlet into said mixing chamber.

12. Apparatus of the type described, comprising a tank having a launder for withdrawing treated water from the upper part of said tank, a vertically extending mixing chamber within said tank and having an inlet opening from the lower part of said tank and an outlet opening into the upper part thereof, a stream-projecting impeller in said mixing chamber, an inclined deflector intermediate the mixing chamber and a wall of the tank for directing treated liquid from the outlet to the inlet portion of said mixing chamber, a waste solids collecting chamber between said mixing chamber and said deflector, and a discharge to waste from said collecting chamber.

13. A water treating apparatus comprising a tank, a partition providing within said apparatus a centrally located mixing chamber, said mixing chamber having a lower inlet and an upper outlet, mechanically driven impeller means adapted to create and maintain a continuous circulation of water undergoing treatment in a path comprising an upward flow in said chamber and a downward flow in said tank outside said chamber and to create a condition of turbulent flow in said chamber, means to deliver water to be treated into said mixing chamber, means to deliver a precipitate forming reagent to said water, an outlet launder for treated water around the periphery of said tank, a waste outlet means in said tank, and rotatable means to deliver to said outlet solids separated from treated water passing to said outlet launder.

14. The process of claim 2 wherein delivery of said second portion of the solids is to a point in the vertical circulation.

15. The process of claim 2 wherein delivery of said second portion of the solids is to a point of discharge to waste.

WALTER H. GREEN.